US012571234B2

(12) United States Patent
Schommer et al.

(10) Patent No.: US 12,571,234 B2
(45) Date of Patent: Mar. 10, 2026

(54) REMOTE LOCK AND KEY TRANSFER WITH OPERATION TIME/USER IDENTIFICATION FUNCTION

(71) Applicants: Philip Eugene Schommer, Macungie, PA (US); Julia Ann McDonell, Macungie, PA (US)

(72) Inventors: Philip Eugene Schommer, Macungie, PA (US); Julia Ann McDonell, Macungie, PA (US)

( * ) Notice: Subject to any disclaimer, the term of this patent is extended or adjusted under 35 U.S.C. 154(b) by 0 days.

(21) Appl. No.: 19/189,762

(22) Filed: Apr. 25, 2025

(65) Prior Publication Data

US 2025/0333978 A1 Oct. 30, 2025

Related U.S. Application Data

(60) Provisional application No. 63/731,388, filed on Apr. 26, 2024.

(51) Int. Cl.
*E05B 19/00* (2006.01)
*E05B 47/00* (2006.01)

(52) U.S. Cl.
CPC .. *E05B 19/0005* (2013.01); *E05B 2047/0056* (2013.01); *E05B 2047/0058* (2013.01); *E05B 2047/0095* (2013.01)

(58) Field of Classification Search
CPC ......... E05B 19/0005; E05B 2047/0056; E05B 2047/0058; E05B 2047/0095
USPC ............................................... 340/5.73, 5.53
See application file for complete search history.

(56) References Cited

U.S. PATENT DOCUMENTS

| | | | | |
|---|---|---|---|---|
| 5,791,172 A * | 8/1998 | Deighton | E05B 19/0005 292/201 |
| 6,046,558 A * | 4/2000 | Larson | G07C 9/00896 318/281 |
| 7,236,085 B1 * | 6/2007 | Aronson | G06Q 20/20 109/46 |
| 8,138,886 B1 * | 3/2012 | Chang | G07C 9/00309 340/5.32 |
| 9,053,629 B2 * | 6/2015 | Fisher | G06Q 50/16 |
| 9,121,199 B2 * | 9/2015 | Li | E05B 47/06 |
| 9,495,820 B1 * | 11/2016 | Li | E05B 47/06 |
| 10,017,960 B2 * | 7/2018 | Kristensen | G07C 9/00309 |
| 10,403,069 B2 * | 9/2019 | Desinor, Jr. | E05B 19/0005 |
| 2003/0179075 A1 * | 9/2003 | Greenman | G07C 9/215 340/5.73 |
| 2014/0250954 A1 * | 9/2014 | Buzhardt | G07C 9/00 70/20 |
| 2019/0139337 A1 * | 5/2019 | Briskey | G07C 9/215 |
| 2024/0127655 A1 * | 4/2024 | Wright | H04L 12/2803 |

* cited by examiner

*Primary Examiner* — Nam V Nguyen
(74) *Attorney, Agent, or Firm* — Sanford J. Piltch

(57) ABSTRACT

Remote access secure lock and entry key transfer with Time/Identification Application of user housed within a molded encasement containing mechanical key retrieval system, electronic circuitry for digital access and integrated with electronic power supply regulation through an external solar panel connected to the molded body of the secure lock attached to a building fixture for non-removal from the building structure location.

9 Claims, 3 Drawing Sheets

REMOTE LOCK AND KEY TRANSFER WITH OPERATION TIME/USER IDENTIFICATION FUNCTION

FIELD OF THE INVENTION

The purpose of the present invention is to assist in identifying and controlling potential unauthorized entry into a secured property and to further secure the property entry details between and among authorized parties.

BACKGROUND OF THE INVENTION

The present invention relates to a method and device for the transfer of an entry key to a secured property or storage space coupled with the ability to confirm the identity of users and the in/out time of entry and subsequent securing of that property. There are presently no such property securing entry key locks available in the market place that incorporate the ability to provide a secure locking space for the property entry key coupled with the ability to monitor the secure transfer by providing time of lock opening and closing by an authorized user and retaining that information for later retrieval.

The present invention permits the securing of a property or storage space by an owner or other authorized user of the property or storage space to provide authorized entry into the controlled space by pre-authorizing a key transfer for entry into a remote property or other storage space and to collect and retain the time of opening of the locking system to obtain the entry key and the closing of the same locking system to return the key. The locking system is comprised of a main body with an internal space for retaining an entry key, an attachment means for attaching the locking system to the remote property or storage space, electronic circuitry to control the opening of the internal space to an authorized user according to a preset program control collecting and retaining the time of request for opening the locking system to obtain the entry key from within and the closure of the locking system on the return of the entry key to the internal space. Also housed within the locking system is a power supply and a power indicator lamp for indicating that the locking system can be accessed in accordance with any authorized code.

SUMMARY OF THE INVENTION

A novel compact locking system for securely storing for permitted access a key or other access device to a building structure. The secure lock system allows its owner to remotely install access credentials for the owner and any designated pre-authorized user by assigning access credentials to other parties to have access to its content, i.e., the building structure access key or other device. According to the invention there is provided, as set out in the appended claims, the ability to install and control a method for controlling and/or monitoring the said device.

The apparatus according to the invention comprises a manufactured main body comprising electronic circuitry and attachment method to a building structure. The main body in its form will encase a compartment to insert a key, and electronic circuitry, power supplies and light along with mounting method. The main body in its form is an injected molded form and can be manufactured from a choice of materials dependent on durability and use.

The apparatus described in detail below is a secure remote entry key lock system for securely retaining a building structure entry key or key fob. The lock system has a body for housing a series of components for functional interoperability of the lock system to facilitate controlled entry into a building structure. These components include an rPi controller board having custom interfaces for interacting with an LED awareness/motion sensor and camera for video input, a power supply switch and regulator for switching between rechargeable batteries and an external power supply, and an LED indicator showing power status of the secure entry key lock system all mounted onto a printed circuit board with receiving ports for external communications pathway access, a mechanical passcode input system with on/off bypass switch, audio input/output including a combined speaker/microphone, one or more mini LCD displays, and a secure key compartment with access controlled door for controlled access to an entry device for the building structure secured within the secure key compartment.

There are a series of external communication pathways including WiFi and/or 4G/5G and Bluetooth® access to the secure remote entry key lock system from mobile devices of an owner user or a pre-authorized user for use by any user in unlocking the secure key compartment through use of a multi-factor unlock mechanism. The multi-factor unlock mechanism utilizes the rPi controller by any authorized users using either a mobile application or by text messaging (SMS) communication, or by utilizing a mechanical numerical switch grouping, by inputting a preset passcode to remotely or locally operate the door of the secure key compartment. A series of proximity detection motion triggered sensors activate the secure remote entry key lock system from standby mode to operational mode for a predetermined time period for any authorized user to access, use and return the building entry device.

In order to activate the secure remote entry key lock system the owner user completes a series of steps on a mobile application to enter and configure a set of credentials in a registry for accessing the secure remote entry key lock system identifying the owner user, any pre-authorized user, a passcode and date/time information for controlling communication between authorized users and the secure remote entry key lock system. The owner user, once identified by the information in the registry, locks out all other authorized users from changing the registry, the credentials of any authorized user, and the passcode.

The secure remote entry key lock system is triggered by the proximity detection motion sensors which switches the secure remote entry key lock system from standby to operational mode engaging the camera for video recording, the combined microphone/speaker for voice communication, and the multi-factor unlock mechanism for unlocking the secure key compartment. When the multi-factor unlock mechanism is engaged it allows for the operation of the door of the secure key compartment by use of the mobile app or SMS texting or through the mechanical numerical switches for the authorized user to enter the passcode remotely or locally. The passcode command from the mobile app or the SMS text, or the passcode entry through the mechanical numerical switches, unlocks the magnetic lock of the secure key compartment.

The secure remote entry key lock system also includes a power management function for monitoring and determining power source and then switching between on-board rechargeable batteries or an external power source for continued operability of the secure remote entry key lock system by displaying power 'on' through an external indicator lamp. The power management function controls the operation of the secure remote entry key lock system in a standby or low power mode enabling the receiving of remote commands through the communications pathways and the proximity sensors.

The secure remote entry key lock also includes, in accordance with the credentials created by the owner user, one or more logs for recording all interactions with and status changes of the secure remote entry key lock system accessed solely by the owner user via any of the communications pathways. The one or more mini LCD time displays provide both local and remote accessible information indicating the time the locking system is opened to access a building entry device previously placed within a secure internal aperture or recess by a pre-authorized user and for displaying the exit time when the building entry device is returned to the aperture or recess within the secure remote entry key lock system.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense and is made solely for the purpose of illustrating the general principles of the invention. The various features and advantages of the present invention may be more readily understood with reference to the following detailed description taken in conjunction with the accompanying drawings.

Figure 1:
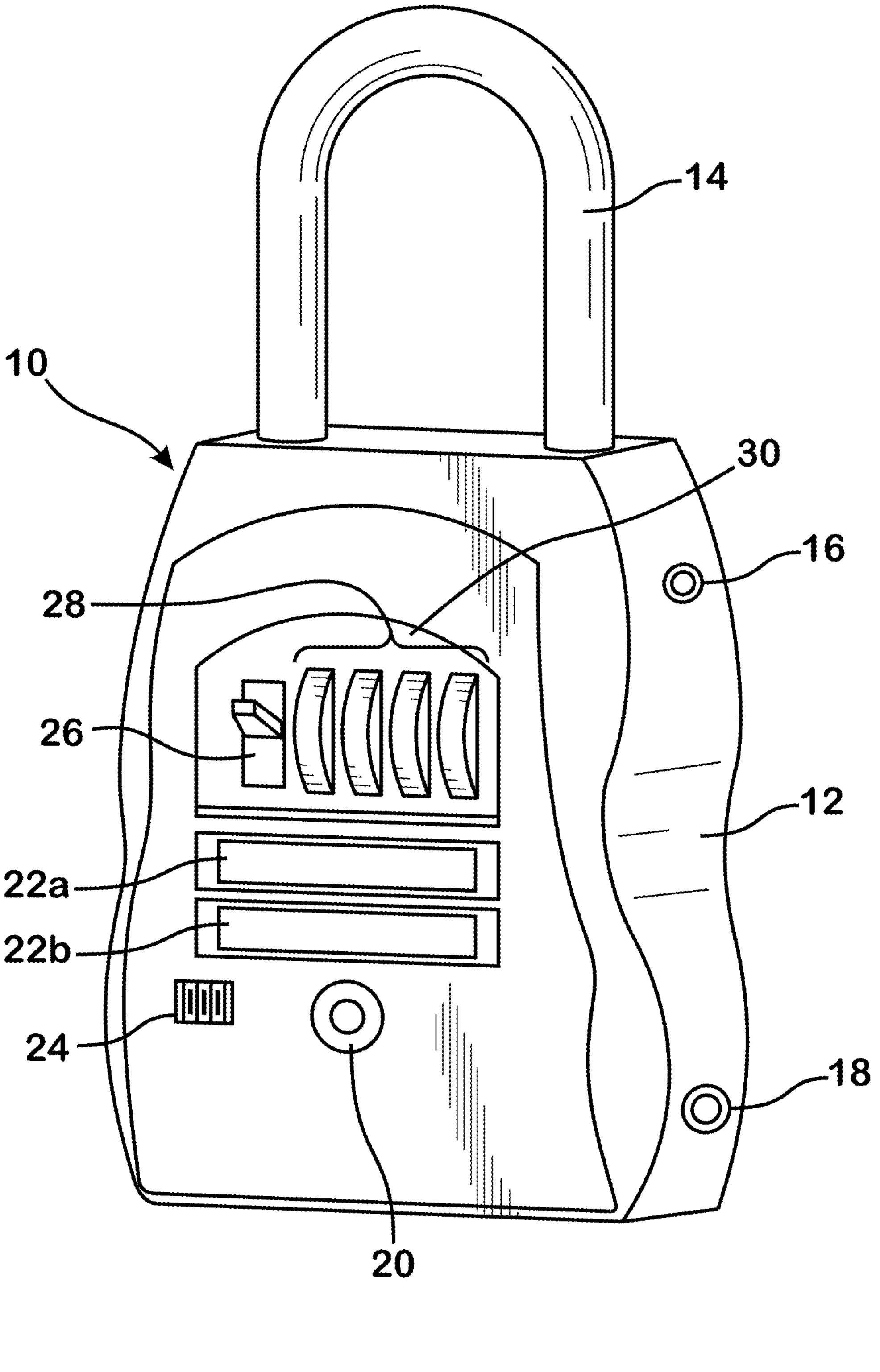
FIG. 1 is a perspective view of the secure entry locking system of the present invention.

Referring now to the drawings in detail, where like numerals refer to like parts or elements, there is shown in FIG. 1 the secure entry key lock system 10 of the present invention. The secure entry key lock system 10 is comprised of an encasement or main body 12 with a mounting bracket in the form of a hasp 14 locked along its upper surface and extending inward into the body 12. The hasp 14 has its opening dimensioned to be able to be attached to a door knob or other fixture presented on an exterior surface of the door, such as a handle, so that the entry key lock system 10 is secured to the exterior door of the structure. The hasp 14 after being placed about a fixture on or adjacent to a building structure is secured within the lock system body 12 by a keeper that extends into a detent in the hasp 14. The keeper retains the hasp 14 in its locked position until such time as a solenoid coil or other magnetic device is energized on command of the owner to withdraw the keeper from the detent on the hasp 14 allowing the hasp to move outward away from the body 12 freeing the lock system 10 from the building fixture so that the lock system 10 can be relocated to a different location or to a different building structure.

The operation of the secure entry key lock system 10 centers around an rPi controller board with the following custom interfaces for controlling a magnetic locking mechanism for interacting with the hasp 14, an LED awareness/motion sensor and camera 20 for video input, a power supply switch and regulator for switching between rechargeable batteries and an external power supply, and an LED indicator 16 showing power status of the secure entry key lock system 10. Also housed on the printed circuit board are receiving ports for WiFi and/or 4G/5G access or Bluetooth® access, a mechanical passcode input system 28 with on/off bypass switch 26, audio input/output 24, a combined speaker/microphone, and one or more mini LCD time displays 22. Two displays are used for indicating the time the locking system is opened (22*a*) to access a key previously placed within an internal aperture or recess 32 by a pre-authorized user and for displaying the exit time (22*b*) when the key is returned to the aperture or recess 32 within the secure entry key lock system 10. The enumerated interfaces, in combination with the controller board, comprise the operating system for the secure entry key lock system 10. An embedded software application will be stored in local memory and executed on the rPi controller board to govern and create the functionality described below.

To be enabled for use, even for basic communications, the system must have sufficient power available and supplied to the rPi and interfaces via the custom printed circuit board. The circuitry on the custom printed circuit board regulates and switches the power of the system between external supply and an internal rechargeable battery. An LED indicator 16 provides power status of the secure entry lock system 10 to the user. An external power supply connection 18 is also provided for the secure entry key lock system 10 to recharge the internal battery.

When sufficient power exists, the Bluetooth® and Network interfaces are always enabled, as is a minimum feature set of the rPi so that remote command and control are supported. Remote commands include, but are not limited to, Enable the lock, Disable the lock, Push configuration, Open the lock, Turn camera on to capture video, Enable audio communication, Turn on mini LCD, Turn on time display, Get video, Check status, and Get logs.

For purposes of this description, two users are defined, an owner user and a pre-authorized user. An owner user configures the remote locking system 10 via a mobile application. The owner user creates a set of credentials through the mobile application that identifies the mobile application user as the owner user and locks out all users who are not owner users from accessing configuration and log information. The Typical configuration information includes, but is not limited to, Date/Time Window of Operation, Pre-authorized user name, Pre-authorized user phone number for SMS unlocking, Pre-authorized user passcode that unlocks the lock (both SMS and mechanical input), and Expiry conditions for pre-authorized user passcode.

When the owner user has completed inputting the configuration information, they push the configuration to the remote secure entry locking system 10 via a User Interface mechanism on the mobile application. The mobile application sends the configuration information across a network connection, which may be one of Bluetooth®, Wi-Fi, or 4G/5G, to the remote secure entry locking system 10.

The owner user enables the secure entry key lock system 10 for use through the mobile application, which communicates via Bluetooth or network interface. The owner user may disable the secure entry key lock system 10 at any time through the mobile application. When enabled for use, an LED awareness input is enabled and the magnetic switch controlling the secure entry key lock system 10 is closed. This condition will also be a low power enabled state.

When the LED awareness input 20 indicates motion is detected in proximity to the secure entry key lock system 10, the following interfaces are enabled: the Camera 20, the Mini LCD Time displays 22*a*, 22*b*, the Audio input/output 24, and the Mechanical passcode input system on/off switch 26. With these interfaces enabled, the following operations are supported: the camera interface records video, the audio input and output provide 2-way audio communication across the network, the pre-authorized user may input the passcode through the manual number wheels 28, which opens the magnetically locked key access door 30 of the locking system 10, the time display window 22*a* shows the time at which the lock was opened, and the mini LCD 22 provides status and warning indicators.

If the pre-authorized user successfully inputs the passcode, the locking system 10 releases the magnetic lock and the key access door 30 is opened allowing access to the stored key or key fob (notshown) within a key safe recess 32. The secure entry lock system 10 interfaces will then stay active for a preset time period. If the device interfaces go inactive due to expiration of the preset time period, the LED awareness/motion sensor 20 is re-enabled and, when reactivated, enables the device interfaces again. Alarms displayed and logged include, but are not limited to: an incorrect passcode input, a passcode input outside of the configured date/time window, No key return, and a low or no Power status. When the pre-authorized user is finished, that user will replace the extracted key or key fob within the key safe recess 32 and lock the system mechanically. Upon relocking, the remote secure entry lock system 10 will re-enter the low-power enabled state.

The pre-authorized user may also use an SMS message with the proper passcode to unlock the device. The message must meet the owner user configuration parameters, including the date/time window of operation. Upon accepting the SMS passcode, the remote locking system 10 unlocks the key safe recess 32, but keeps all remaining interfaces disabled until the LED awareness/motion sensor indicates motion. At that time, all interfaces are enabled as described above.

Figure 3:
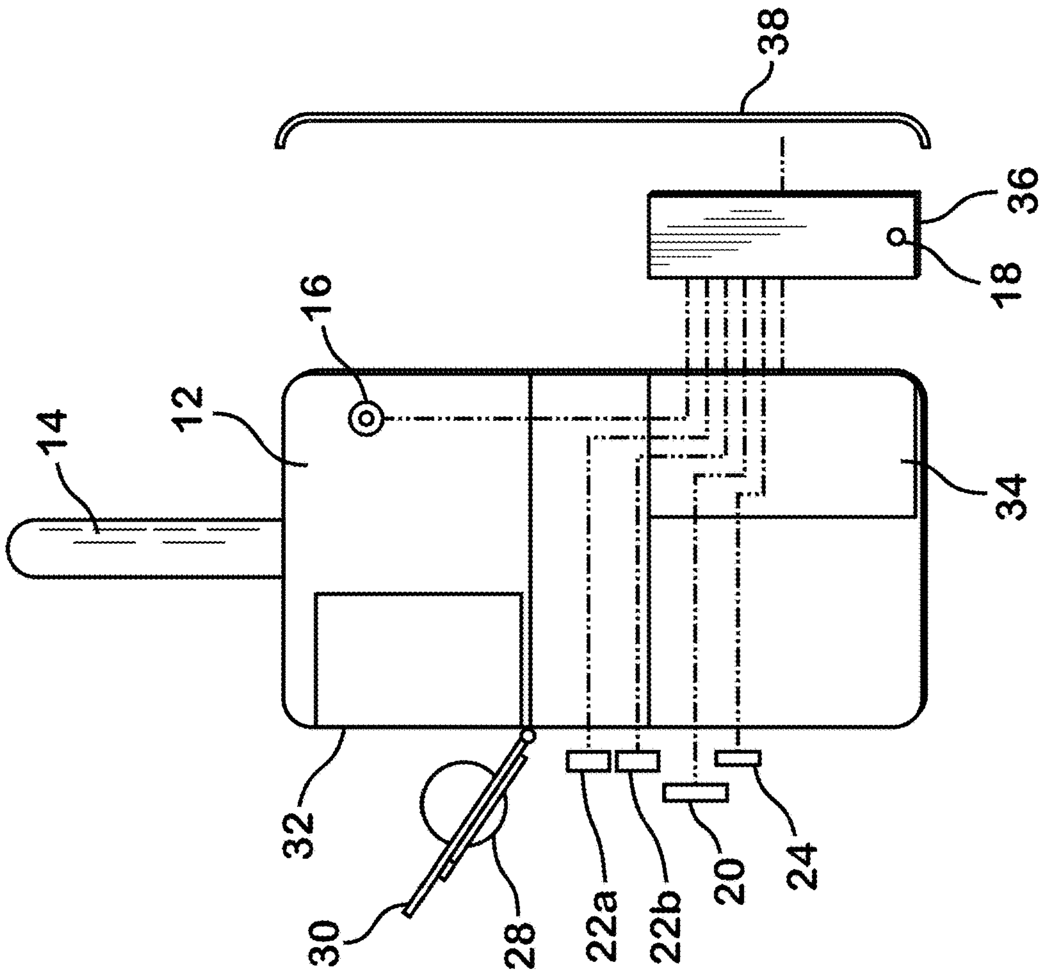
FIG. 3 is a side schematic view of the internal compartments and housing for the secure entry locking system components of the present invention.
Figure 2:
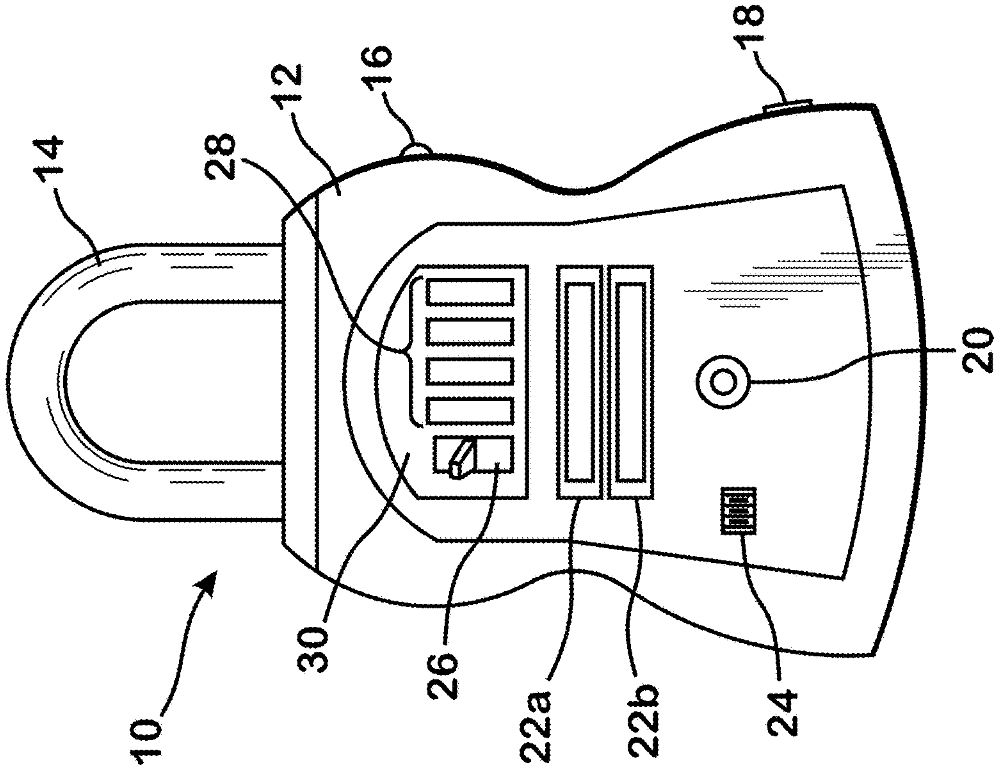
FIG. 2 is a front view of the secure entry locking system of the present invention

With reference to FIG. 3, and in addition to those elements already identified, there is one additional recess 34 indicated for housing the rPi control panel 36. Access to this rPi control panel 36 is made through the removal of the secure entry key lock system back panel 38. The dashed lines in FIG. 3 are used to indicate the wiring connections between the rPi control panel 36 and the various interconnected devices 16, 20, 22*a*, 22*b*, 24. The rPi control panel 36 also houses the external power source connection 18.

Both the mobile application and the remote secure key locking system 10 save detailed logs of the configuration operation and all operations that occur at the date/time they occur. Logs are available to the owner user's credentials only. Embedded device logs are stored in the rPi storage facility and are available for upload to the mobile application with the owner user's credentials.

The Controller Board (rPi) acts as the central processing unit for managing all components and interactions of the secure key entry lock system 10. The key interfaces are with the custom printed circuit board (PCB), with the external networks, and with the internal peripheral devices. The printed circuit board interface manages the magnetic lock, power regulation and monitoring, and all sensor inputs. The network interface supports communication with WiFi, 4G/5G cellular telephony, and Bluetooth® communication pathways. The peripheral interfaces create direct communication with the audio input/output, i.e., the combined microphone and speaker, the video imaging device providing both proximity sensing and video linking, the mechanical input for the magnetic lock release, and the mini-LCD screens for local messaging with a pre-authorized user.

The custom PCB includes the functionality of power regulation for the secure key entry lock system 10. Housed on the PCB is a power monitoring circuit that will regulate power for the lock system 10 switching between on board battery power and an external power source as required. The PCB also provides visual indicators in the form of LEDs for showing power status and motion detection, e.g., LED 16. The PCB connects directly with the controller board for streamlined power and data flow and supplies consistent power to the rPi and the various device interfaces. The PCB facilitates the activation of component devices of the secure entry key lock system 10, for example the LED indicator 16 and the magnetic lock for the key recess 32 upon a command received from the rPi controller.

Power Management for the PCB and the rPi is housed on and integrated onto the PCB. The power management circuit ensures uninterrupted operation via the on-board solar-charged battery and/or external power. The power status to the rPi and users is indicated through LED 16 located along one side of the body 12.

The Magnetic Lock Mechanism is directly controlled via the custom PCB by the toggling of remote commands or by a passcode input. The magnetic lock mechanism is mounted on the lock housing, physically securing the key within the key recess 32 within the body 12 of the secure entry key lock system 10.

The various sensors and indicators inform the controller (rPi) of sensed status so that the controller can activate the appropriate interfaces. If immediate proximity motion is detected the rPi is triggered to enable higher power components within the secure entry key lock system 10 as described above. The LED 16 and LCD 22 indicators provide status feedback, e.g., power and activity status. Certain peripheral interfaces engage upon motion detection. These interfaces include the camera 20, audio 24, and LCD displays 22 and become active upon motion detection or user command providing interaction and monitoring capabilities for both remote and local users. Using the Passcode mechanical input for direct unlock functionality will signal to the controller to verify the previously provided passcode and, if the passcode is correct, execute the command by releasing the magnetic lock on the key recess 32.

Configuration and Operation

The owner configures the secure entry key lock system 10 via a mobile app in which the owner sets credentials for the owner and any pre-authorized user and sets schedules for use of the lock system 10 and passcodes for accessing the key for the building structure. Commands from either the owner or the pre-authorized user flow through the described communications pathways to activate the lock system 10 or any of its peripheral devices. Unlocking of the secured key is accomplished by either the mechanical input switches 28 or by an SMS passcode sent from the owner or pre-authorized user's mobile device triggering the events described above to unlock the magnetic lock providing access to the secure key recess 32 via door 30. During the course of these events on board components, e.g., camera and audio, are activated to record and log the events according to date and time. All actions are logged locally and remotely, ensuring accountability as well as traceability to a known user. Dynamic switching between solar and external power ensures operational continuity of the secure entry key lock system 10.

The interfaces, in combination with the controller board (rPi), support the functionality of the secure entry key lock system 10. An embedded software application is stored in local memory and executed on the rPi controller board to govern and create the functionality described. To be enabled for use, even for basic communication, the system must have sufficient power available and supplied to the rPi and interfaces via the custom PCB. The circuitry on the custom PCB regulates power level and switches the power needs for the system between an external supply and internal solar-charged battery. An LED indicator provides power status to the user. When sufficient power exists, the Bluetooth® and Network interfaces are always enabled, as is a minimum feature set of the rPi so that remote command and control are supported. Remote commands include, but are not limited to, Enable the lock, Disable the lock, Push configuration, Open the lock, Turn on camera, Enable audio communication, Turn on mini LCD, Turn on time display, Get video, Check Status, and Get Logs. For purposes of this description, two users are defined: Owner user and Pre-authorized user An owner user configures the remote lock system 10 via mobile application. The owner user creates a set of credentials through the mobile application that identifies them as the owner user and locks out all users who are not owner users from accessing configuration and log information. The typical configuration information includes, but is not limited to: Date/time Window of Operation, Pre-authorized username, Pre-authorized user phone number for SMS unlocking, Pre-authorized user passcode that unlocks the lock (both SMS and mechanical input), and Expiry conditions for pre-authorized user passcode. When the owner user has completed inputting the configuration information, they push the configuration to the remote lock system via UI mechanism on the mobile application. The mobile application sends the configuration information across a network connection, which is Bluetooth®, WiFi, or 4G/5G, to the remote lock system 10. The owner user enables the key lock for use through the mobile application, which communicates via the Bluetooth® or network interface. The owner user may disable the key lock at any time through the mobile application. When enabled for use, LED awareness input is enabled and the magnetic switch controlling the key lock is closed. This is a low-power, but enabled state.

When the LED awareness input indicates motion is detected, the following interfaces are enabled: Camera, Time display, Mini LCD, Audio input, Audio output, and Mechanical passcode input system on/off switch. With these interfaces enabled, the following operations are supported: the camera interface records video, the audio input and output provide 2-way audio communication across the network, the pre-authorized user may input the passcode, which opens the key lock, the time display shows the time at which the key lock was opened, and the mini LCD provides visual status and warning indicators.

If the pre-authorized user successfully inputs the passcode, the key lock is opened and the interfaces stay active for a preset time period. If the device goes inactive due to time, the LED awareness/motion sensor is re-enabled and, when activated, enables the interfaces again. Alarms displayed and logged include, but are not limited to, Wrong passcode input, Passcode input outside of the configured date/time window, No key return, and Power issue. When the pre-authorized user is finished, they will replace the extracted key and lock the system mechanically. Upon relocking, the remote lock system 10 will re-enter the low-power but enabled state.

The pre-authorized user may also use an SMS message with the proper passcode to unlock the device. The message must meet the owner user configuration parameters, including the date/time window of operation. Upon accepting the SMS passcode, the rPi controller unlocks the key lock, but keeps all remaining interfaces disabled until the LED awareness/motion sensor indicates motion. At that time, all interfaces are enabled as described above. Both the mobile application and the remote lock system 10 save detailed logs of the configuration operation and all operations that occur as they occur. Logs are available to the owner user's credentials only. Embedded device logs are stored in the rPi controller storage facility and are available for upload to the mobile application with the owner user's credentials.

Figure 4:
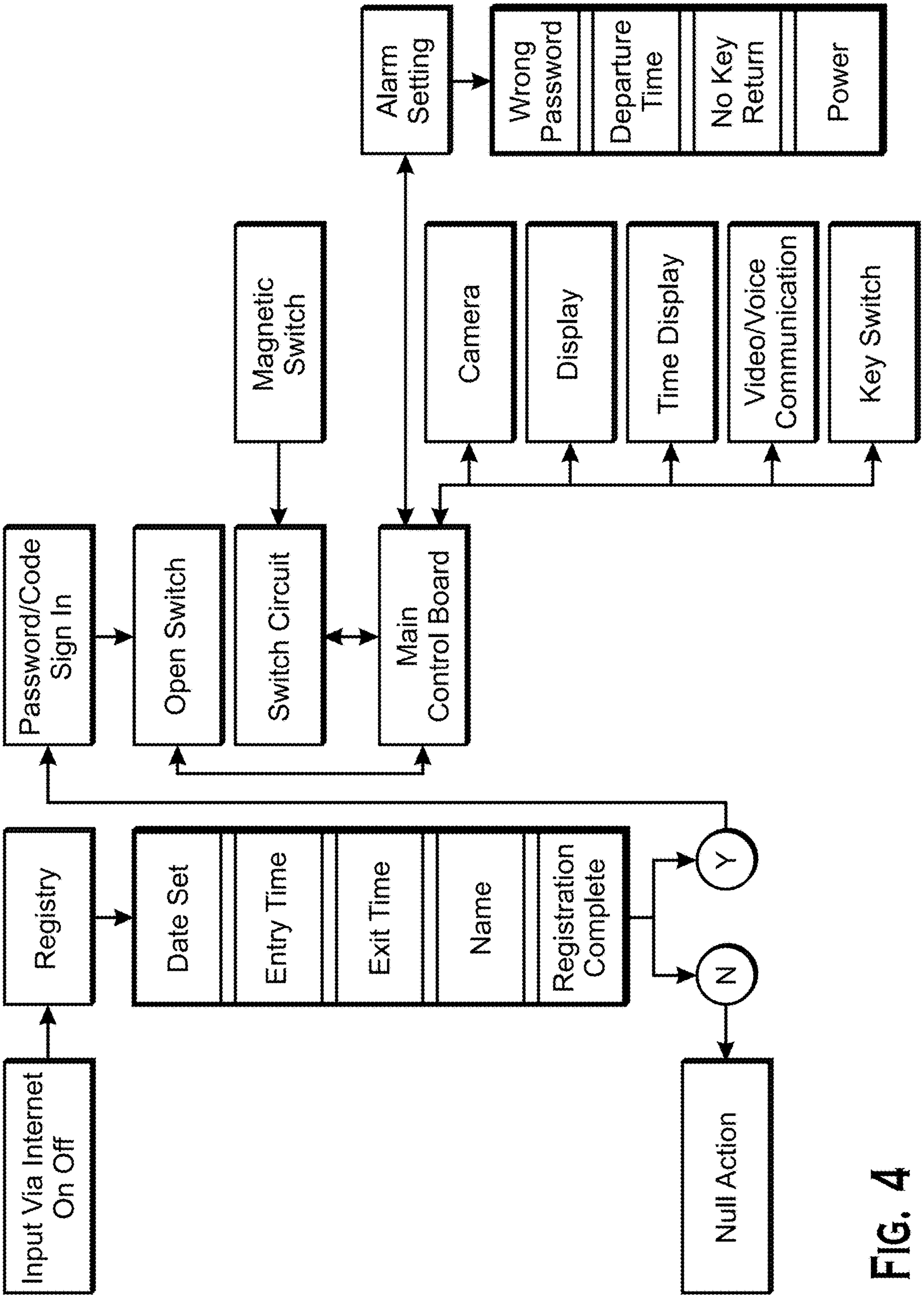
FIG. 4 is a diagrammatic flow chart of the control system of the locking system of the present invention.

With reference to FIG. 4, a detailed flow and component diagram is shown for the secure entry key lock system 10. The remote lock system operation centers around an rPi controller board [Main Control Board] with initial status being low power/receiving mode. Initial input is made via a mobile app into the Registry by the owner user with steps to set the date, entry and and times, names of owner and any pre-authorized users, and any additional information needed to identify the owner and any pre-authorized users such as mobile phone numbers for SMS usage. With the completion of the entry of the required information, a Registration Complete indication occurs.

The next step is for the pre-authorized user to sign in and enter the passcode either through SMS text messaging or through the mechanical switches 28. The passcode, once verified, will cause the rPi controller to activate its switching circuit to engage the magnetic lock releasing the secure key recess door 32 so that the pre-authorized user can access the building key. With the verifying of the passcode various components are activated including the camera 20, the LCD displays 22, including the time display, the video/voice communication through the camera 20 and microphone/speaker 24, and the key switch sequence for opening the key recess door 32 is initiated.

If an incorrect passcode is detected the rPi controller goes into an alarm status. Also triggering an alarm occurs when the departure time exceeds the time period for returning the key to the key recess 32 within the secure entry key lock system 10 with an indication alarm that the key was not returned. All alarm indications are logged and transmitted to the owner user via the mobile app. When an alarm is recorded the lock system 10 will return to low power mode until another activation by proximity of a potential user is detected.

The research carried out to achieve computation capability for the rPi controller of the secure entry key lock system 10 included reviewing various platforms such as RP 2040 boards with alternative choices such as Pimoroni's Tiny RP2040, SparkFun's Pro Micro RP2040 and Adafruit's QT Py RP2040 along with Arduino's Nano RP2040. In doing so the most advantageous computational capability was found ensuring the correct eco-system is met using Adafruit's Feather RP2040 with software modification to complete the unit's conductivity and communication enabling the desired result for the embodiment to perform as desired.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A secure remote entry key lock system for securely retaining a building structure entry key or key fob comprising:

a body for housing a series of components for functional interoperability of the lock system including an raspberry Pi controller board having custom interfaces for interacting with a light emitting diode awareness/motion sensor and camera for video input, a power supply switch and regulator for switching between rechargeable batteries and an external power supply, and a light emitting diode indicator showing power status of the secure entry key lock system all mounted onto a printed circuit board with receiving ports for external communications pathway access, a mechanical passcode input system with on/off bypass switch, audio input/output including a combined speaker/microphone, and one or more mini liquid crystal displays, and a secure key compartment with access controlled door for accessing the building structure entry device secured within the secure key compartment;

a series of external communication pathways including WiFi and/or 4G/5G and Bluetooth® access to the secure remote entry key lock system from mobile devices of an owner user or a pre-authorized user for use by any user in unlocking the secure key compartment through use of a multi-factor unlock mechanism based upon a set of credentials created by the owner user utilizing the raspberry Pi controller by any authorized users utilizing a mobile application or by text messaging (SMS) communication or by utilizing a mechanical numerical switch grouping by inputting a preset passcode to remotely or locally operate the door of the secure key compartment;

a series of proximity detection motion triggered sensors to activate the secure remote entry key lock system from standby mode to operational mode for a predetermined time period for any authorized user to access, use and return the building structure entry device, whereas the one or more mini liquid crystal displays provide local and remote accessible information indicating the time the locking system is opened to access a building structure entry device previously placed within said secure key compartment by a pre-authorized user and for displaying the exit time when the building structure entry device is returned to the secure key compartment within the secure remote entry key lock system.

2. The secure remote entry key lock system of claim 1, whereas the owner user completes a series of steps on the mobile application to configure a set of credentials in a registry for accessing the secure remote entry key lock system identifying the owner user, any pre-authorized user, a passcode and date/time information for controlling communication between authorized users and the secure remote entry key lock system.

3. The secure remote entry key lock system of claim 2, whereas the owner user, once identified by the information in the registry, locks out all other authorized users from changing the registry, the credentials of any authorized user and the passcode.

4. The secure remote entry key lock system of claim 1, whereas the triggering of the proximity detection motion sensors switches the secure remote entry key lock system from standby to operational mode engaging the camera for video recording, the combined microphone/speaker for voice communication, and the multi-factor unlock mechanism for unlocking the secure key compartment.

5. The secure remote entry key lock system of claim 4, whereas the engaging of the multi-factor unlock mechanism allows for the operation of the door of the secure key compartment by use of the mobile app or text messaging SMS communication or through the mechanical numerical switches for the authorized user to enter the passcode remotely or locally.

6. The secure remote entry key lock system of claim 5, whereas the passcode command from the mobile app or the text messaging SMS communication or the passcode entry through the mechanical numerical switches unlocks the magnetic lock of the secure key compartment.

7. The secure remote entry key lock system of claim 6, whereas a power management function controls the operation of the secure remote entry key lock system in a standby or low power mode enabling receiving remote commands through the communications pathways and the proximity sensors.

8. The secure remote entry key lock system of claim 1 further comprising a power management function for monitoring and determining power source and switching between on-board rechargeable batteries or an external power source for continued operability of the secure remote entry key lock system by displaying power on through an external indicator lamp.

9. The secure remote entry key lock system of claim 1 further comprising, in accordance with said credentials created by the owner user, one or more logs for recording all interactions with and status changes of the secure remote entry key lock system accessed solely by the owner user via any of the communications pathways.

* * * * *